Aug. 25, 1964     P. A. PEARSON     3,146,417

TRANSFORMER

Filed May 25, 1959     4 Sheets-Sheet 1

PRIMARY CURRENT PATH

PAUL A. PEARSON
*INVENTOR.*

BY

ATTORNEYS

Aug. 25, 1964   P. A. PEARSON   3,146,417
TRANSFORMER

Filed May 25, 1959   4 Sheets-Sheet 2

PAUL A. PEARSON
INVENTOR.

BY
*Fleke and Swain*
ATTORNEYS

Aug. 25, 1964     P. A. PEARSON     3,146,417

TRANSFORMER

Filed May 25, 1959     4 Sheets-Sheet 3

PAUL A. PEARSON
INVENTOR.

BY

*Flehr and Swain*

ATTORNEYS

Aug. 25, 1964    P. A. PEARSON    3,146,417
TRANSFORMER
Filed May 25, 1959    4 Sheets-Sheet 4

PAUL A. PEARSON
INVENTOR.

BY
ATTORNEYS

United States Patent Office 3,146,417
Patented Aug. 25, 1964

3,146,417
TRANSFORMER
Paul A. Pearson, 1200 Bryant, Palo Alto, Calif.
Filed May 25, 1959, Ser. No. 815,517
19 Claims. (Cl. 336—69)

This invention relates generally to a transformer and more particularly to pulse, broad band sine-wave, and/or current transformer.

In transformers, inductive and capacitive components of impedance are presented by the windings, both in lumped and distributed forms. The capacitance arises mainly from the electric coupling between windings and other structures such as the core. The inductance arises from magnetic coupling; the flux coupling the windings to the core, if one is present, and the leakage flux. These capacitances and inductances make the transformer frequency sensitive, which may, in certain instances, give rise to unwanted signal distortion. For instance, the distributed capacitance and inductance may act as a transmission line whose transmission characteristics are deleterious to proper operation of the transformer.

The foregoing limits the range of constant amplitude vs. frequency over which the transformer can be operated. Transformers which have large distributed capacitance and inductance usually are not suited for high frequency and pulse work.

It is a general object of the present invention to provide a transformer which has very high frequency response and improved pulse rise-time response, while retaining good low frequency sine-wave or good pulse flat-top characteristics.

It is another object of the present invention to provide a transformer which includes a distributed load resistance.

It is still another object of the present invention to provide a transformer suitable for high voltage applications.

It is a further object of the present invention to provide a transformer which includes a distributed load resistance which is part of a transmission line.

It is a further object of the present invention to provide a transformer of the above character which can be easily calibrated and which retains its calibration indefinitely.

It is a further object of the present invention to provide a transformer which includes a plurality of serially connected sections each including part of the load resistance.

It is another object of the present invention to provide a transformer which includes double shielding.

It is still another object of the present invention to provide a current transformer which has improved pulse rise-time response while retaining good low frequency sine-wave or good pulse flat-top characteristics.

It is still a further object of the present invention to provide a current transformer including improved means for positioning conductors within the transformer opening and at the same time providing a relatively long electrical leakage path along the positioning means.

These and other objects of the invention will become more clearly apparent from the following description when taken in conjunction with the accompanying drawing.

Referring to the drawing:

FIGURE 1 is a schematic diagram of a transformer in accordance with the present invention;

FIGURE 2 schematically shows a transformer in accordance with the prior art;

To facilitate understanding of the invention, a brief analysis of current transformer operation is presented. Starting with one of Maxwell's equations:

$$\operatorname{curl} H = J + \frac{dD}{dt} \qquad (1)$$

where H is the magnetic intensity; J is the current density; and $dD/dt$ is the time rate of change of displacement current. Applying Stokes' law, the following relationship is obtained:

$$\int (\operatorname{curl} H) \cdot da = \oint H \cdot ds = \int J \cdot da + \int \frac{dD}{dt} \cdot da \qquad (2)$$

where $da$ is elemental area, and $ds$ is elemental length of the perimeter of the area chosen for the integration.

Figure 2:
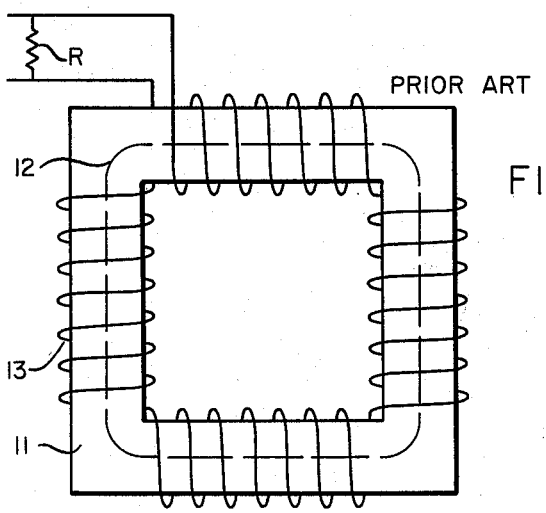
Figure 5:
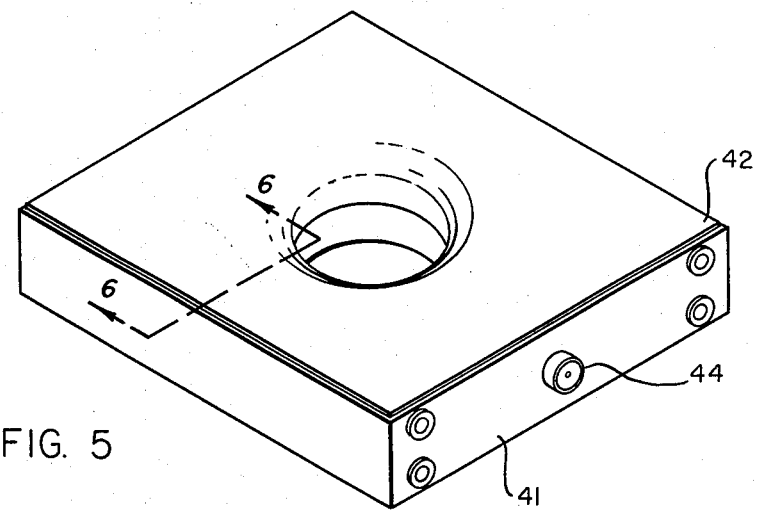
FIGURE 5 is a perspective view of a transformer in accordance with the present invention.

Consider a transformer core such as rectangular toroid 11 of the type shown in FIGURE 2. Assume the path of integration shown by the dotted line 12. The integral of current density over the area enclosed by the path of integration is simply the number of turns of wire passing through this area times the current flowing through the winding 13

$$\oint H \cdot ds = N_p i_p - N_s i_s \qquad (3)$$

where $N_p$ are the primary turns; $i_p$ is the primary current; $N_s$ are the secondary turns; and $i_s$ is the secondary current. H is uniform along the entire path of integration for a toroid and primary current that is perfectly symmetrical. For a rectangular core 11 of the type illustrated, H is not quite uniform across the thickness of the core, but with the windings made as long as possible and the length of the path of integration long in comparison to the cross-sectional dimension of the core, H is nearly uniform.

Defining the line integral $$\oint ds = l$$

where $l$ is the length of the path of integration, and remembering that $$B = \mu H$$

where B is the magnetic flux density, and $\mu$ is the permeability, the following equation results:

$$\oint H \cdot ds = Hl = \frac{Bl}{\mu} \qquad (4)$$

Combining (3) and (4)

$$B = (\mu/l)(N_p i_p - N_s i_s) \qquad (5)$$

The output voltage $v_s$ is given by the formula $$v_s = i_s R = N_s \frac{d\phi}{dt} \qquad (6)$$

where R is the load resistance, $i_s$ is the load current and $\phi$ is the total flux. Making the approximation that B is uniform across the cross-section of the core and that the core fills the entire volume inside the winding, both of which are nearly true, and combining Equations 5 and 6

$$i_s R = N_s \frac{d\phi}{dt} = N_s A \frac{dB}{dt} = \frac{\mu N_s^2 A}{l}\left[\frac{N_p}{N_s}\frac{di_p}{dt} - \frac{di_s}{dt}\right] \quad (7)$$

$$\frac{\mu N_s^2 A}{l} \quad (8)$$

is the familiar equation for inductance L.

Consider now the response of the transformer to rectangular pulses. For a practical, high performance unit such as the one that will be presently described, the individual terms on the right-hand side of Equation 7 are relatively large compared to $i_s R$ for pulse rise times that are even very slow, as much as ten microseconds. Therefore, the term $i_s R$ can be disregarded, giving $$\frac{N_p}{N_s}\frac{di_p}{dt} - \frac{di_s}{dt} = 0 \quad (9)$$

Integrating we find that the ratio of secondary to primary current is inversely proportional to the ratio of primary to secondary number of turns during the rising part of the pulse.

$$\frac{i_s}{i_p} = \frac{N_p}{N_s} \quad (10)$$

Multiplying both sides of Equation 10 by the load resistance R gives the ratio of output voltage $v_s$ to input current, which can be defined as the effective resistance of the transformer, $R_{eff}$.

$$R_{eff} = \frac{v_s}{i_p} = \frac{N_p}{N_s} R \quad (11)$$

This expression holds true for the fall time portion of a pulse since the transformer is a linear device and acts the same for increasing and decreasing currents.

Consider now what happens, after the rise of the pulse is over, during the flat-top of the pulse. For this, $$di_p/dt = 0$$

for an ideal pulse, and Equation 7 reduces to $$i_s R = -L\frac{di_s}{dt} \quad (12)$$

Rearranging the terms gives $$\frac{di_s}{i_s} = -\frac{R}{L}dt \quad (13)$$

$di_s/i_s$ is what is normally called the droop of a pulse transformer voltage or current, in this case current droop. $dt$ is the time interval occupied by the flat portion of the pulse and can be written as $\tau$. Thus, the equation reduces to $$D = -\frac{R}{L}\tau \quad (14)$$

where D is droop.

We now have the two important performance characteristics of a transformer (performance during rise and fall, and during the flat-top) in terms of the physical characteristics of the transformer.

If one considers the response of the transformer to an input sinewave, it can be immediately seen that for very high frequency sinewaves the terms involving rate of change of current with respect to time are very large compared to $i_s R$. Therefore, the relationships of Equations 10 and 11 are applicable. Although from the relationships in these equations it might seem that the frequency limit of the transformer is infinite, it is not true, since the time derivative of the vector D in Equation 2 was disregarded. This represents the capacitive current that flows in the transformer winding in addition to the normal currents which have been considered.

Figure 3:
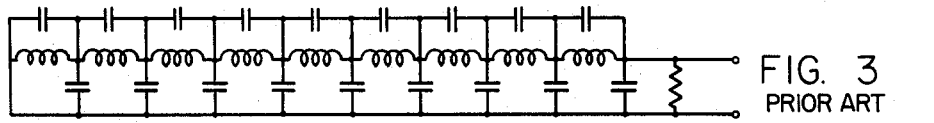
FIGURE 3 shows an equivalent circuit for the transformer of FIGURE 2.

From the foregoing, it is seen that a transformer of the type shown in FIGURE 2 has a large inductance due to the many turns of wire and also has capacitance associated with each of the windings. The combination of inductance and capacitance forms resonant circuits whose resonance can cause unwanted frequency distortion. These inductances and capacitance can also act as a transmission line whose transmission characteristics are deleterious to proper functioning of the transformer. A pulse of voltage induced in the winding at one part of the transformer might, in traveling through the transmission line to the output terminals, have its waveshape changed because of the various frequency components in the signal. These components travel at different speeds and have different attenuations. An equivalent circuit of the transformer of FIGURE 2 might be as shown in FIGURE 3.

Figure 1:
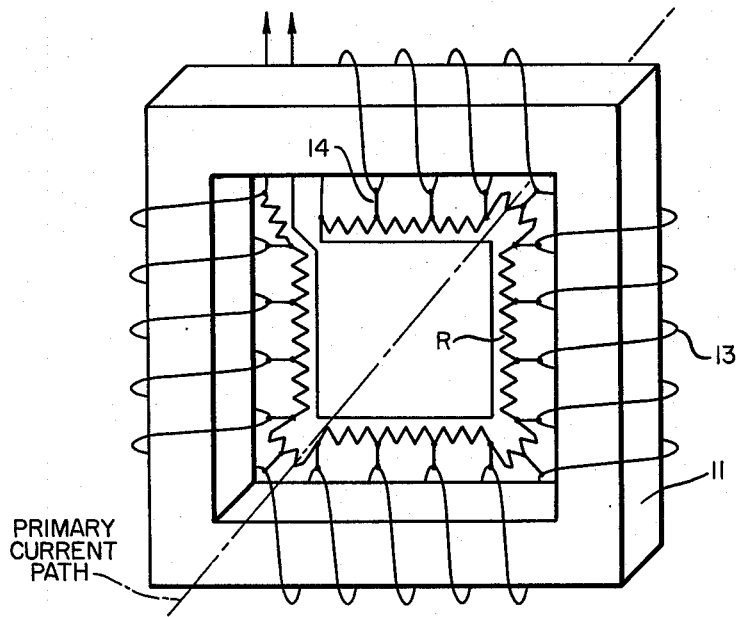

Referring to FIGURE 1, a schematic perspective view of a transformer having improved characteristics is illustrated. The transformer of FIGURE 1 includes a core 11 having a plurality of windings 13 formed thereon. The load resistor R is formed as a distributed resistor which has a plurality of taps 14 connected to portions of the windings of the transformer. The taps are connected roughly to proportional parts of the coil structure as shown schematically in the figure.

Figure 4:
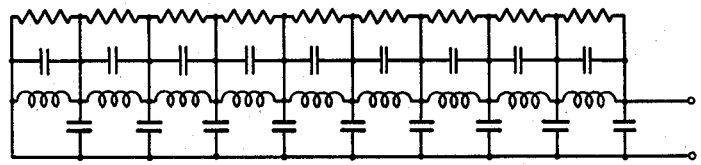
FIGURE 4 is an equivalent circuit for the transformer of FIGURE 1.

An equivalent circuit for the foregoing is shown in FIGURE 4.

Each of the sections of winding and transformer included between two taps is now itself a small transformer, whose contribution to the total output voltage is proportional to the fraction of the transformer determined by the number of turns and the proportion of resistance and capacitance between taps.

The individual sections behave as series inductance and resistance with the capacitance effects being negligible. This is assumed in the preceding analysis where the inductance of the winding and the loading resistance appear as important factors and the capacitive (displacement) currents are neglected.

In order to obtain stability and precision of calibration, the distributed load resistance is formed from high resistance, small diameter wire. For example, in one instance, the wire was .0027 inch in diameter. The inductance of such fine wire traversing the path of the toroid is itself appreciable in affecting the high frequency and transient response of the transformer and becomes the limiting factor.

It is a further feature of the present invention to provide a distributed resistance in which the inductance of the resistance wire is reduced by incorporating the resistance wire in a transmission line whose natural inductance per unit length is greatly reduced below that of the fine resistance wire itself.

Figure 9:
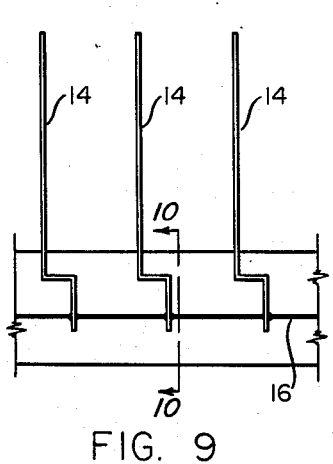
FIGURE 9 is an elevational view of a transmission line resistor for use in the transformer.
Figure 10:
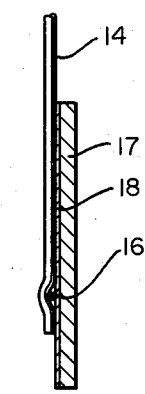
FIGURE 10 is a sectional view taken along the line 10—10 of FIGURE 9.
Figure 6:
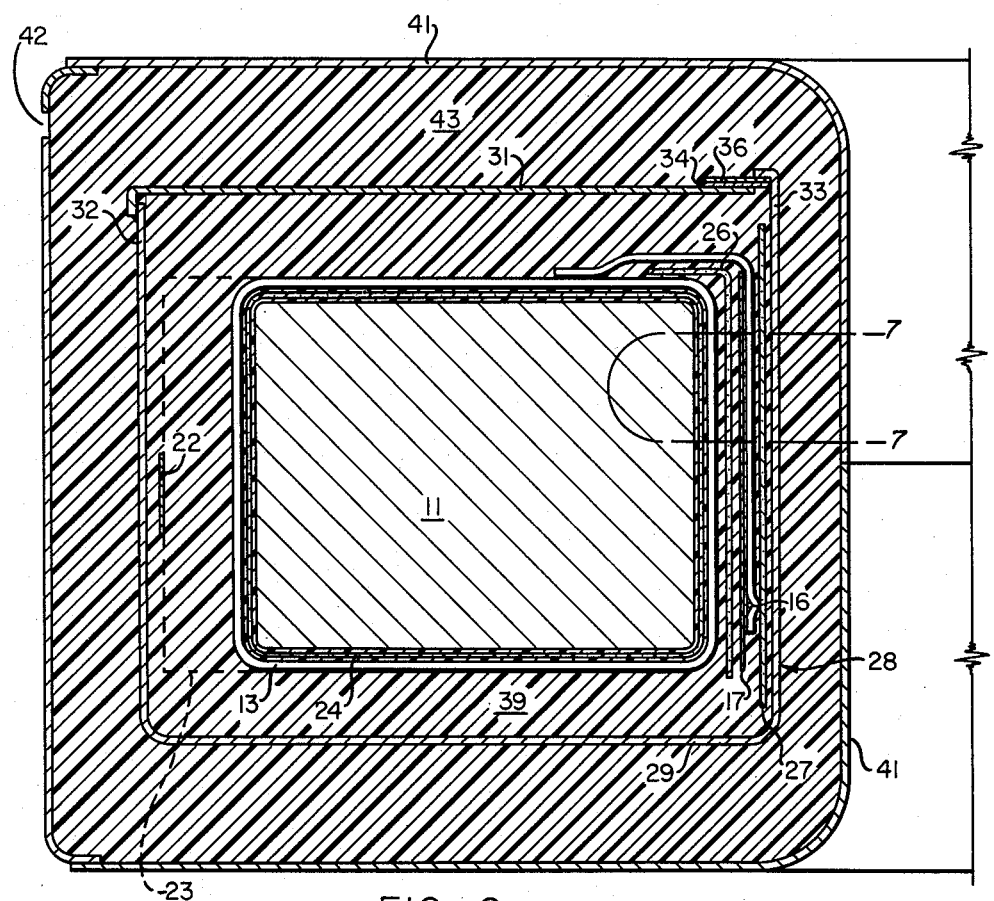
FIGURE 6 is a sectional view taken along the line 6—6 of FIGURE 5.
Figure 7:
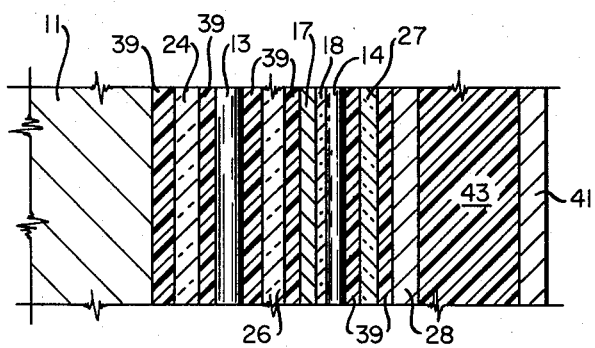
FIGURE 7 is an enlarged view taken along the line 7—7 of FIGURE 6.
Figure 8:
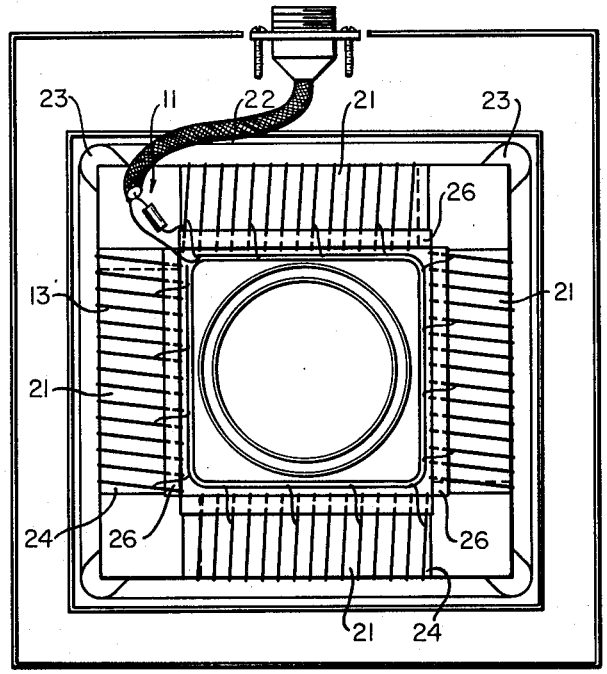
FIGURE 8 is a top view of the transformer with the top plate removed.

A tapped or distributed resistance in accordance with the invention is illustrated in FIGURES 9 and 10. The resistance wire 16 is placed parallel to a conductor 17 which is illustrated as being planar with a thin layer of insulating material 18 between the wire 16 and conductor 17. The various taps 14 are connected along the resistance wire 16 and are adapted to connect to the associated turns of the transformer winding.

The load resistance is in effect a single wire transmission line 16 over a conductive plane 17. When the plane is used as the return path for the signal winding, the inductance of the resistance is greatly reduced.

The feature of having the terminating resistance form a part of the current transformer is, in itself, a useful thing. The manufacturer can have under his control the amplitude calibration of the output voltage as a function of input current. For radio engineering and pulse engineering use, most waveform viewing and calibrating devices are voltage devices such as high impedance cathode ray oscilloscopes and vacuum tube voltmeters. Normally, the current transformer when used with pulse or high frequency devices would feed into a cable which would then go to the cathode ray oscilloscope. Since the cable has a definite impedance, it is necessary for best transient and frequency response to have the impedance of the transformer match that of the cable in order to avoid reflections. For instance, if the cable is a standard fifty-two ohm cable, the loading resistor of the current transformer should not exceed fifty-two ohms. If it is less than fifty-two ohms, a series resistor may be added to bring the resistance of the transformer as seen by the cable up to the cable impedance. The cable then directly feeds a high input impedance device such as a standard calibrated high frequency cathode ray oscilloscope. This is in contrast to the normal procedure of placing the terminating resistor at the load end of the cable.

The effect that the current transformer load resistance has upon the high frequency response and transient performance of the transformer depends upon the ratio of resistance to inductance of the load resistance. The higher the ratio, the better the high frequency and transient response.

Figures 11, 12:
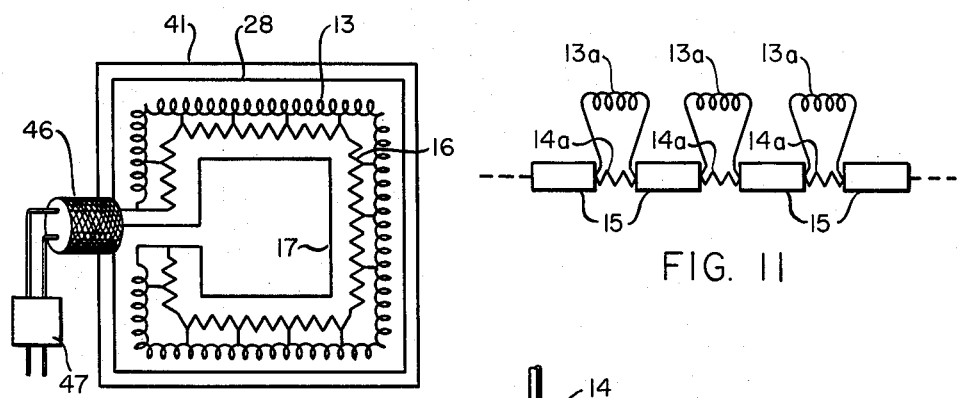
FIGURE 11 is a schematic view of another resistor in accordance with the invention.
FIGURE 12 is a schematic view showing the electrical connections to the transformer.

In making a transformer which will monitor high currents, it is necessary to make the value of the load resistance relatively low. If the resistance wire has to traverse the same length for a very high current model as for a low current model, the ratio of resistance to inductance becomes appreciably worse. To combat this problem, the load resistance is broken up into short lengths as shown in FIGURE 11 in which the resistance portions 14a are separated by relatively wide, high conductance portions 15. The individual resistors are short and possibly thick and wide, thus lowering the inductance of the individual resistance well below the inductance of the resistance if it had a length equal to the length per section. The connecting wires are secured to the ends of the resistance portions 14a. Wide copper strips may be used for the high conductance portions. The resistance portions are connected in shunt with corresponding coil sections 13a.

Referring to FIGURES 5–8, there is illustrated a transformer constructed in accordance with the invention. The core 11 is made up of a plurality of L-shaped sections 21 (FIGURE 8) which are adapted to abut and form a continuous toroid. The sections are maintained in assembled relationship by means of a strap 22 which rides over the corner supports 23 and urges the sections together to form a tight fit between the abuting faces of the core sections 21.

The core of the transformer is preferably made of material whose penetration time for magnetic flux is short. By way of example, two mil grain oriented silicon steel, which is a popular material for microsecond pulse transformers, is not satisfactory for high performance pulse current transformers. The reason for this is that the current that should be flowing in the secondary to balance the primary current actually flows in the laminations of the core as eddy currents for a period of time depending upon the thickness of the laminations. This alters the waveform and amplitude characteristics of the transformer. By way of further example, ferrite cores are suitable since their penetration time for magnetic flux is relatively short and the eddy current effect is small or negligible.

The rectangular shaped toroid formed in a plurality of L-shaped sections allows assembly of prefabricated coils on the straight sides of each of the sections of the core. This is advantageous since an uncut circular toroid would be much more expensive to wind. It has been found that the unused corners of the core do not effect the overall performance of the transformer in any appreciable way. However, to minimize the effect of the corners, it is necessary to wind the coil over as much length of the toroid as possible. If only a portion of the core is wound, the effect is to give a different amplitude response for different positions of the primary conductor going through the center of the transformer. This can be seen from Equation 4 wherein the assumption was made that a uniform H existed along the path of integration.

The windings 13 are wound on a hollow tubular insulating member 24 and suitably affixed thereto. The tubular member 24 has an internal configuration which is adapted to receive the core 11. Four tubular sections may be slipped onto the four legs of the toroidal core 11. An L-shaped insulating spacer 26 is placed over the windings 13 in the inside of the core to insulate the same from the ground plane 17 of the transmission line. A second insulating spacer 27 is placed between the resistive transmission line and the metal shield 28 which surrounds the wound toroid. The shield 28 includes a lower annular U-shaped portion 29 adapted to receive the wound toroid and a cover 31 which is suitably affixed to the outer leg 32 of the shield and which extends inwardly toward the inner leg 33. The cover 31 is spaced from the leg 33 to provide a gap in the shield. An insulating ring 34 is inserted over the leg 33 and a metallic holding ring 36 is placed over the insulating ring 34. The upper end of the leg 33 is suitably secured to the holding ring 36.

The interior of the shield 28 is filled with suitable dielectric material 39 to thereby maintain the various parts in fixed relationship with respect to one another.

A second shield 41 surrounds the inner shield and is toroidal in form. The outer shield 41 includes a gap 42. The space between the outer and inner shield is filled with a suitable dielectric material 43 to maintain the two shields in fixed relationship within one another. A coaxial connector 44 is mechanically secured (not electrically) to the outer shield (FIGURE 5) and provides means for connecting to the transformer windings.

The two transformer shields give double shielding. When a conductor whose current is to be monitored is at a very high voltage and where this voltage may rapidly change with time, capacitive currents flow between the conductor and the outer shield. The shield includes a break 42 so that it does not constitute a shorted turn for the transformer. The capacitive current flowing in this loop sets up voltages across the loop or portions of it. This voltage can be coupled to the transformer winding and can result in spurious signals which are not a function of the current but a function of the voltage between the conductor and the shield. To minimize this effect, two shields are used in the transformer. The voltage developed across the inside shield, while being great enough in value to possibly affect the output if it were used alone, does not have enough voltage to affect the output if a second shield is provided inside of the outer shield.

The double shielding has other advantageous features. If the outer shield is connected to ground or to the framework of equipment in which it is used and there is an accidental flashover from the high voltage conductor to the outer shield, the high currents and dangerous voltage will not involve the inner shield which is normally connected to the associated equipment. Thus, personnel using the transformer and associated equipment are protected.

In many applications, high currents flow in the framework, chassis or grounding systems. The result is that different parts of the framework or ground systems are at different moderately high voltages. If the outside shield is mounted to one part of the framework or grounding system, a direct connection to the cable and inner shield is avoided, thus avoiding spurious signals in the output.

Even though the mounting and grounding of the outer shield does not involve a direct connection to the inner shield and the cable to the instrumentation, there is still capacitive coupling between the outer and inner shields. If high frequency or transient currents flow in the outer shield and develop a voltage across it, they can be capacitively coupled to the inner shield. To minimize this effect, one can use low dielectric constant material between the outer and inner shields and large spacing between the shields. This is not always feasible. For instance, if the space between the inner and outer shields is filled with plastic, a low dielectric plastic is indicated. An alternative is to fill the plastic or other supporting structure with a number of voids. These voids can take the form of spheres, hollow glass spheres or other low dielectric voids.

As described, the inner and outer shields include a break in order to avoid shorting the transformer. This makes the shield an inductance having one turn. There is an appreciable capacitance associated with the break in the shields. The capacitance and inductance can form a resonant circuit which may introduce signals in the output. If the capacitance effect is unavoidable, the resonance effect can be reduced or eliminated by shunting the break in the shield by a resistance of the proper value to lower the Q of the resonant circuit.

Referring to FIGURE 12, a transformer having output connections arranged to reduce the extraneous signal in the output is illustrated. The output cable 46 is a twin conductor coaxial cable. The output of the transformer is connected to the two inner conductors of the twin conductor cable. The outer conductor is connected to the inner shield of the transformer. In a transformer having a single coaxial cable, any current flowing in the outer shield of the coaxial line develops voltages along the outer shield of the cable which then appear in the output of the cable. In the arrangement shown in FIGURE 12, voltage is induced in the two parallel inner conductors by voltage drop in the outer shield. Since the same extraneous voltage is induced in both of them, the net result is that zero extraneous voltage appears at the output of the common mode rejection means 47. The common mode rejection means may comprise an isolating transformer which has proper shielding so that the capacitive coupling of the common voltage is avoided. Further, magnetic fields which would develop a voltage across one of the inner conductors will induce nearly the same voltage in the other conductor and, therefore, these voltages will also tend to cancel one another.

The transformer described can be used for very high voltages as well as low voltages. It is noted that the hole in the outer shield is very large and that the corners are radiused so that minimum electric fields are set up. In this way, the measurement of high frequency currents can be made in conductors which are at very high voltages. The transformer is suitable not only for monitoring currents flowing in conductors, but also for monitoring electron beams. In such application, the transformer is placed so that the electron beam flows through the opening. If the beam of electrons is modulated with high frequency A.-C. or pulses, the transformer gives an accurate indication of the waveform and amplitude of the electron beam.

Figure 13:
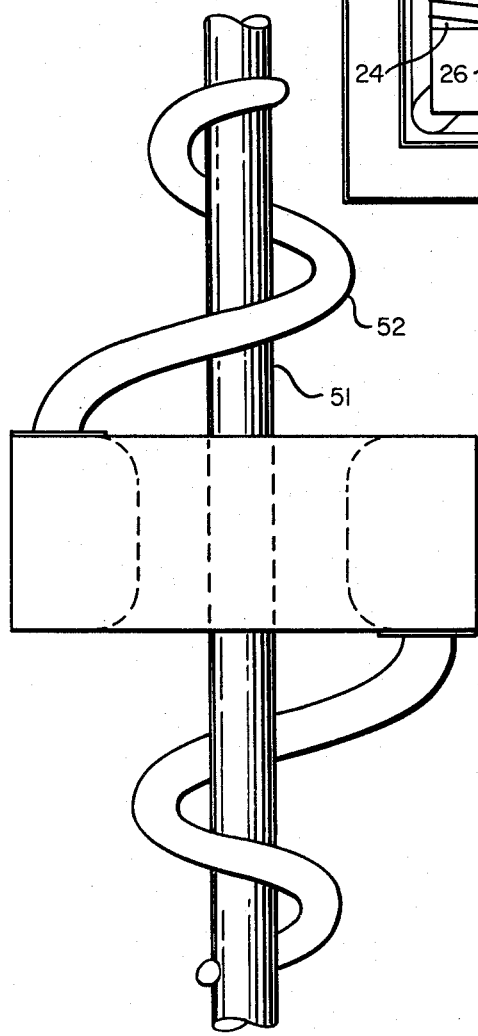
FIGURE 13 shows a transformer including insulating means for positioning conductors within the transformer opening.

It is advantageous to center high voltage conductors within the opening. For this purpose, it is possible to employ a fixed conductor 51, FIGURE 13, which is supported centrally within the opening of the transformer by a spiral insulator 52. One end of the spiral conductor is suitably mounted to the transformer while the other end supports the conductor 51.

Although the preceding discussion is directed to current transformers, it is apparent that the principles involved are not limited to these applications. For instance, the use of tapped resistors as the loading on a transformer can lead to high quality audio or video voltage transformers having extended frequency bandwith.

A transformer was constructed in accordance with the present invention. The transformer was as shown in the figures. The specifications were as follows.

Core material _____ Manganese zinc ferrite, such as Ferroxcube 3C2.
Core dimensions:
  Mean path length _____ 21 inches.
  Cross section _____ 1 inch x 1 inch.
Winding:
  Number of turns _____ 144.
Resistor:
  Resistance _____ 36 ohms.
  No. of taps _____ 18.
  Series matching resistance ___ 12.
Inner shield:
  Length of side _____ 7".
  Opening _____ 3¾", 1⅝" thick.
Outer shield:
  Length of sides _____ 8" and 9", 2¾" thick, 3½" hole with ½ radius edges.

A transformer constructed in accordance with the foregoing had the following characteristics:
(1) Pulse voltage, 30 kv. in air, 300 kv. in oil, with 1.25 inch center conductor.
(2) Output voltage/ampere, 0.25+1%, —0%.
(3) Rise time, —20 milli-microseconds.
(4) Droop, 0.1% per microsecond.
(5) Pulse current, 2,000 amps peak, 15 amps RMS.
(6) Insertion resistance, less than 0.002 ohm.
(7) (a) Insertion capacitance, two micro-microfarads in air.
  (b) Insertion capacitance, four micro-microfarads in oil.

I claim:
1. A transformer of the type which is operable over a wide band of frequencies with substantially uniform response over said band of frequencies including a plurality of successive serially connected transformer sections, each of said sections including a winding substantially disposed in a common flux path and a substantially linear resistance means connected in shunt therewith, and output terminals connected to a predetermined number of said serially connected sections to provide an output which is proportional to the sum of the output of the individual transformer sections.

2. A transformer of the type which is operable over a wide band of frequencies with substantially uniform response over said band of frequencies including a winding having a plurality of winding turns disposed to be inductively coupled to the magnetic field surrounding flowing charged particles, a substantially linear load resistance, said load resistance and winding having successive portions connected in shunt with one another to form a plurality of successive serial transformer sections, and means for connecting a predetermined number of said successive serially connected sections to an output means whereby the output is proportional to the sum of the outputs of the individual transformer sections.

3. A transformer as in claim 2 wherein said resistance means and said winding include a plurality of taps with taps of said resistance connected to corresponding taps of said winding to form the transformer sections.

4. A transformer of the type which is operable over a wide band of frequencies with substantially uniform response over the band of frequencies including a primary winding, a plurality of successive serially connected secondary transformer sections, each of said secondary transformer sections including a secondary winding adapted to be disposed in a common flux path with the primary winding, a substantially linear resistance means connected in shunt therewith, and output terminals connected to a predetermined number of said serially connected sections to provide an output which is proportional to the sum of the output of the individual transformer sections.

5. A transformer of the type which is operable over a wide band of frequencies with substantially uniform response over said band of frequencies including a winding having a plurality of winding turns coupled substantially to the same magnetic flux, a substantially linear load resistance having a plurality of taps, means for connecting said plurality of successive taps to predetermined successive winding turns of said winding, a conductor disposed parallel to and spaced closely adjacent to said load resistance to form therewith a distributed constant transmission line, said conductor having one end connected to one end of said resistance and winding, and a pair of output terminals, one of said terminals electrically connected to the other end of said winding and the other of said terminals connected to the other end of said conductor.

6. A transformer of the type which is operable over a wide band of frequencies with substantially uniform response over said band of frequencies including a plurality of successive serially connected transformer sections, each of said sections including a winding adapted to be substantially disposed in a common flux path, substantially linear resistance means connected in shunt therewith, output terminals connected to a predetermined number of said sections to provide an output which is proportional to the sum of the output of the individual trasnformer sections, and a first shield surrounding both said winding and resistance means, said shield including a gap.

7. A transformer as in claim 6 including a second shield including a gap spaced from said first shield and surrounding the same.

8. A transformer as in claim 6 wherein said output terminals form the center conductors of a twin coaxial transmission line with one of the center conductors connected to the first shield.

9. A transformer as in claim 6 including a second shield including a gap spaced from said first shield and surrounding the same.

10. A transformer of the type which is operable over a wide band of frequencies with substantially uniform response over said band of frequencies including a magnetic core, a plurality of successive serially connected transformer sections, each of said sections including a winding wound on said core and a substantially linear resistance means connected in shunt with said winding, and output terminals connected to a predetermined number of said sections to provide an output which is proportional to the sum of the output of the individual transformer sections.

11. A transformer as in claim 10 wherein said core is in the form of a closed magnetic path.

12. A transformer as in claim 10 wherein said resistance is part of a distributed constant transmission line.

13. A transformer of the type which is operable over a wide band of frequencies with substantially uniform response over said band of frequencies including a magnetic core, said core being formed of a plurality of straight leg portions adapted to fit within one another to form a continuous closed core, a plurality of successive serially connected transformer sections, each of said sections including a winding wound on said core, a substantially linear resistance means connected in shunt with said winding, and output terminals connected to a predetermined number of said sections to provide an output which is proportional to the sum of the output of the individual transformer sections.

14. A transformer as in claim 13 together with a first toroidal shield enclosing said core, windings and resistance portion, said shield including a gap to thereby form an open circuited turn.

15. A transformer as in claim 13 including a second toroidal shield spaced from said first shield and serving to enclose the first shield, said second shield including a gap forming an open circuited turn.

16. A transformer of the type which is operable over a wide band of frequencies with substantially uniform response over said band of frequencies including a winding having a plurality of winding turns disposed to be inductively coupled to the magnetic field surrounding flowing charged particles, a load resistance including resistance portions interconnected by high conductive, low inductance connecting portions, successive resistance portions of said load resistance being connected to a predetermined number of successive turns of said winding to form a plurality of successive serially connected transformer sections, and output terminals connected to a predetermined number of said transformer sections.

17. A transformer as in claim 16 including a magnetic core onto which is wound said winding.

18. A transformer as in claim 2 wherein said successive portions of said load resistance and winding are proportional.

19. A transformer as in claim 1 wherein said transformer sections are substantially identical.

References Cited in the file of this patent

UNITED STATES PATENTS

| | | |
|---|---|---|
| 1,533,178 | Gilbert | Apr. 14, 1925 |
| 2,276,855 | Meador | Mar. 17, 1942 |
| 2,327,774 | Dickinson | Aug. 24, 1943 |
| 2,540,560 | Wheeler | Feb. 6, 1951 |
| 2,591,936 | Hepp | Apr. 8, 1952 |
| 2,714,710 | Bradley | Aug. 2, 1955 |
| 2,729,788 | Schweitzer | Jan. 3, 1956 |
| 2,958,037 | Riede | Oct. 25, 1960 |